(12) United States Patent
Munenaga et al.

(10) Patent No.: US 8,932,740 B2
(45) Date of Patent: Jan. 13, 2015

(54) BATTERY CELL AND METHOD OF MANUFACTURING THE SAME

(75) Inventors: Noriyoshi Munenaga, Kyoto (JP); Taku Nakamura, Kyoto (JP)

(73) Assignee: GS Yuasa International Ltd., Kyoto-Shi, Kyoto (JP)

( * ) Notice: Subject to any disclaimer, the term of this patent is extended or adjusted under 35 U.S.C. 154(b) by 428 days.

(21) Appl. No.: 13/378,348

(22) PCT Filed: Jun. 16, 2010

(86) PCT No.: PCT/JP2010/060180
§ 371 (c)(1),
(2), (4) Date: Dec. 14, 2011

(87) PCT Pub. No.: WO2010/147136
PCT Pub. Date: Dec. 23, 2010

(65) Prior Publication Data
US 2012/0088138 A1    Apr. 12, 2012

(30) Foreign Application Priority Data

Jun. 17, 2009   (JP) .............................. 2009-1434964

(51) Int. Cl.
*H01M 4/00* (2006.01)
*H01M 2/04* (2006.01)
*H01M 2/26* (2006.01)

(52) U.S. Cl.
CPC ............ *H01M 2/0443* (2013.01); *H01M 2/263* (2013.01)
USPC .......................................... 429/94; 29/623.1

(58) Field of Classification Search
CPC ..... H01M 2/0443; H01M 2/263; Y02E 60/12
USPC ............................................. 429/94; 29/623
See application file for complete search history.

(56) References Cited

U.S. PATENT DOCUMENTS

2004/0185332 A1* 9/2004 Botos .............................. 429/96
2005/0287431 A1   12/2005 Cho
(Continued)

FOREIGN PATENT DOCUMENTS

JP   5-508512 A    11/1993
JP   2000-150306 A    5/2000
(Continued)

OTHER PUBLICATIONS

Extended European Search Report dated Feb. 4, 2013.

*Primary Examiner* — Gary Harris
(74) *Attorney, Agent, or Firm* — McGinn IP Law Group, PLLC

(57) ABSTRACT

Provided is a battery cell that allow the inner surfaces of connection strips of a current collector to be brought into contact with the outermost circumferential surface of a layered electrode portion of a power generating element while preventing the connection strips from scratching the layered electrode portion. The battery cell includes: a power generating element formed of cathode and anode sheets that are wound up with a separator interposed between the cathode and anode sheets, the power generating element having a layered electrode portion on at least one side of the winding axis direction, the layered electrode portion being one of a cathode and an anode; a current collector having a connection strip arranged along an outermost circumferential surface of the layered electrode portion, the current collector being conductively connected to an external terminal; and a clamp including a first clamp portion that clamps the layered electrode portion and a second clamp portion that clamps the layered electrode portion clamped by the first clamp portion and the connection strip of the current collector together.

18 Claims, 12 Drawing Sheets

(56) References Cited

U.S. PATENT DOCUMENTS

| | | | |
|---|---|---|---|
| 2006/0051664 A1* | 3/2006 | Tasai et al. | 429/161 |
| 2007/0009793 A1* | 1/2007 | Kim et al. | 429/175 |
| 2009/0104518 A1 | 4/2009 | Nedelec et al. | |
| 2009/0104525 A1 | 4/2009 | Nakagawa et al. | |

FOREIGN PATENT DOCUMENTS

| | | |
|---|---|---|
| JP | 2003-346770 A | 2/2003 |
| JP | 2004-111300 A | 4/2004 |
| JP | 2006-12830 A | 1/2006 |
| JP | 2007-19017 A | 1/2007 |
| JP | 2008-516383 A | 5/2008 |
| JP | 2009-26490 A | 2/2009 |
| JP | 2009-99488 A | 5/2009 |
| JP | 2009-105074 A | 5/2009 |
| WO | WO 92/22095 A1 | 12/1992 |
| WO | WO 2004/086533 A2 | 10/2004 |

* cited by examiner

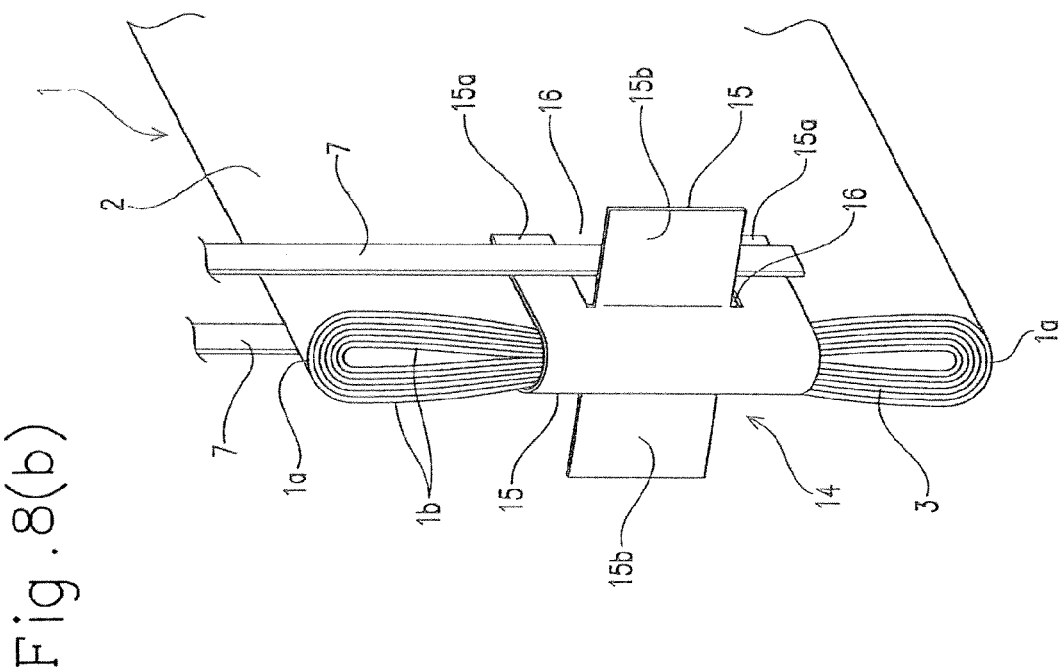
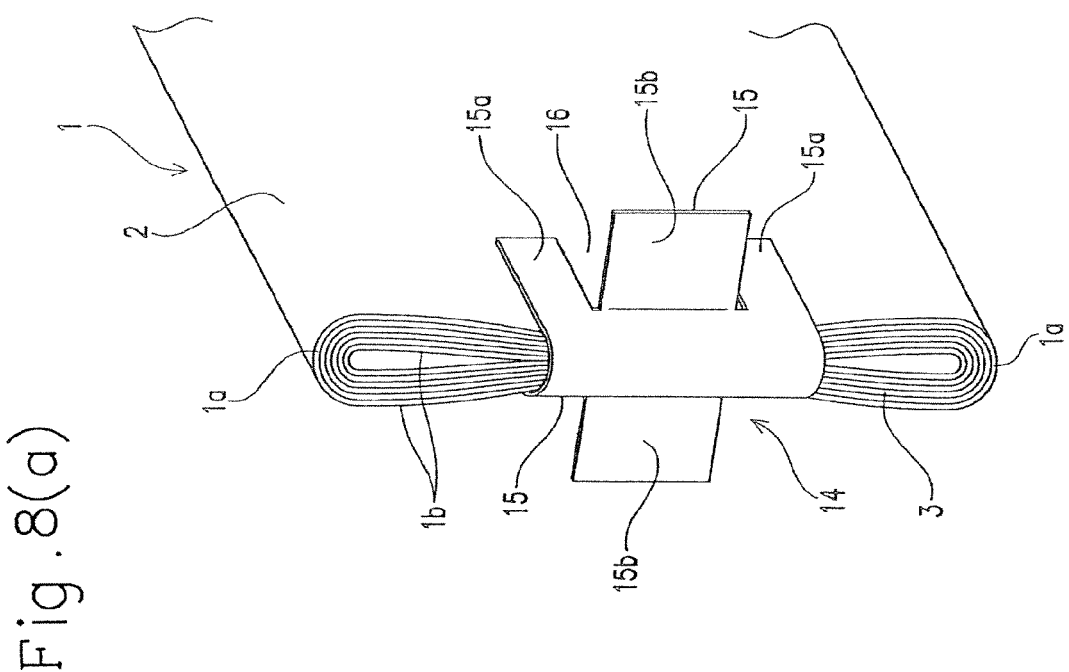

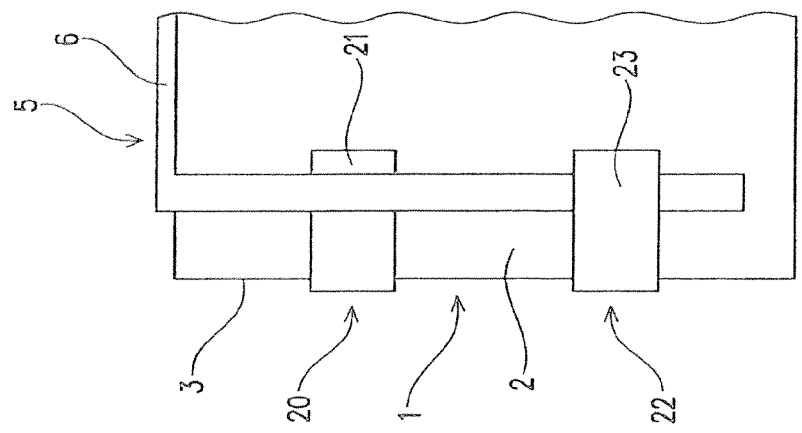
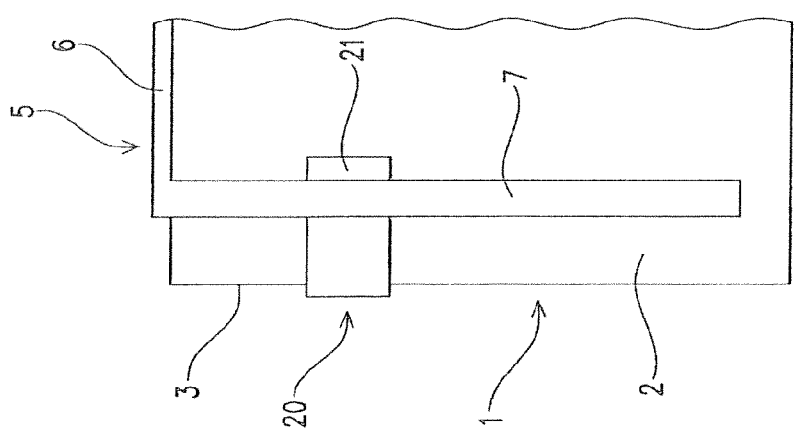
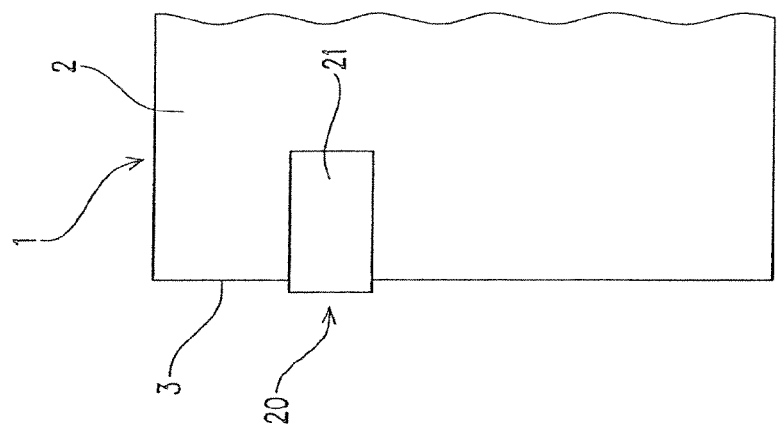

US 8,932,740 B2

BATTERY CELL AND METHOD OF MANUFACTURING THE SAME

TECHNICAL FIELD

The present invention relates to a battery cell including: a power generating element formed of cathode and anode sheets that are wound up with a separator interposed therebetween; and a current collector that is electrically conductively connected to the power generating element, and the invention also relates to a method of manufacturing the battery cell.

BACKGROUND ART

A hitherto known battery cell of the above type includes: a power generating element that is formed of cathode and anode sheets, each sheet having electrode active material layers on both sides, wound up with a separator interposed between the cathode and anode sheets; current collectors each having a body to which an electrode terminal that is drawn out to the outside is conductively connected and connection strips extending from the corresponding body along the outermost circumferential surface of the layered electrode portion; and clamps that each hold the connection strips of the current collector in pressure contact with the outermost circumferential surface of the layered electrode portion while the connection strips are held in contact with the outermost circumferential surface of the layered electrode portion (cf., Patent Document 1).

The power generating element is formed by being wound up into a cylindrical shape, and then pressed from opposite sides into an oblong shape, i.e., a flattened shape, thus provided with curved portions located at upper and lower ends and a linear flat portion located between the curved portions. Cathode and anode layered electrode portions are formed at opposite ends of the power generating element. The body of each current collector has a triangular shape in plan view, and arranged on the upper surface of the curved portion of the power generating element along the axial direction no that its large-width portion (bottom portion) is positioned above the layered electrode portion while its small-width portion (crown portion) faces the small-width portion of the body of the opposite current collector. The small-width portion of the body is held in conductive connection with an electrode terminal that is drawn out to the outside. The connection strips of each current collector extend from the large-width portion of the body along the flat portion of the power generating element, thus forming a comb shape. Each pair of the connection strips forms a reverse U-shape to define a space therebetween into which the layered electrode portion is inserted

PRIOR ART DOCUMENT

Patent Document

Patent Document 1: Japanese Patent Application Laid-open No. 2003-346770

SUMMARY OF THE INVENTION

Problems to be Solved by the Invention

However, the above conventional battery cell has a problem in that: when the layered electrode portion having an oblong cross section is inserted between a pair of the connection strips of each current collector, and the inner surfaces of the pair of the connection strips of the current collector are brought into contact with the outermost circumferential surface of the layered electrode portion, the layered electrode portion, which expands outwardly, may be scratched by the connection strips or may bend the connection strips. A further problem is that: the layered electrode portion and the connection strips are both clamped together by a single clamp, and therefore the positioning of these three members is difficult, which may result in poor connection or decreased productivity.

In view of the above problems, the present invention provides a battery cell and a method of manufacturing the same, which allows connection strips of each current collector to be brought into contact with the outermost circumferential surface of a layered electrode portion of a power generating element while preventing the connection strips from scratching the layered electrode portion or from being bent.

Means for Solving the Problems

In order to solve the above problems, the present invention provides a battery cell that includes:

a power generating element formed of cathode and anode sheets that are wound up with a separator interposed between the cathode and anode sheets, the power generating element having a layered electrode portion on at least one side of the winding axis direction, the layered electrode portion being one of a cathode and an anode;

a current collector having a connection strip arranged along an outermost circumferential surface of the layered electrode portion, the current collector being conductively connected to an external terminal; and a clamp including a first clamp portion that clamps the layered electrode portion and a second clamp portion that clamps the layered electrode portion clamped by the first clamp portion and the connection strip of the current collector together.

In this case, the first clamp portion of the clamp clamps the layered electrode portion, and the layered electrode portion is therefore prevented from expanding outward with its thickness reduced. This facilitates contact of the inner surfaces of the connection strips with the outermost circumferential surface of the layered electrode portion, and thus prevents the connection strips of the current collector from scratching the layered electrode portion or from being bent.

What is more, the second clamp portion clamps the connection strips of the current collector after the inner surfaces of the connection strips are held in contact with the outermost circumferential surface of the layered electrode portion that has been clamped by the first clamp portion. Because of this, positioning of the layered electrode portion and the connection strips of the current collector relative to each other is facilitated, and therefore a reliable conductive connection is established between the layered electrode portion and the current collector.

According to the present invention, the battery cell may include separate clamps, one of which clamps a first side of the layered electrode portion, and the other of which clamps a second side of the layered electrode portion. Alternatively, the clamp may be configured to clamp both the first and second sides of the layered electrode portion. In the structure in which the power generating element is formed into a flattened shape and thus provided with a pair of curved portions and first and second flat portions located between the curved portions, it is preferred that the flat portion be clamped.

Furthermore, in the battery cell of the present invention, the clamp may preferably include a pair of the first clamp portions and the second clamp portion disposed between the pair of first clamp portions. In the above structure that includes separate clamps, one of which clamps a first side of the layered electrode portion and the other of which clamps a second side of the layered electrode portion, each of the clamps may include a first clamp half and a second clamp half, and the second clamp half may include upper and lower clamp strips and a central clamp strip. With this structure, the first clamp half and the upper and lower clamp strips of the second clamp half may be employed as the first clamp portions, and the first clamp half and the central clamp strip of the second clamp half may be employed as the second clamp portion. On the other hand, in the above structure in which the clamp clamps both the first and second sides of the layered electrode portion, the clamp may include a first clamp half and a second clamp half, each including upper and lower clamp strips and a central clamp strip. With this structure, the upper and lower clamp strips of the first clamp half and the upper and lower clamp strips of the second clamp half may be employed as the first clamp portions, and the central clamp strip of the first clamp half and the central clamp strip of the second clamp half may be employed as the second clamp portion.

In this case, the first clamp portions each disposed at both sides of the second clamp portion press the layered electrode portion to thereby make the layer thickness of the layered electrode portion smaller at a region near the second clamp portion. This facilitates contact of the connection strips of the current collector with the outermost circumferential surface of the layered electrode portion near the second clamp portion.

Furthermore, a battery cell according to the present invention includes:

a power generating element formed of cathode and anode sheets that are wound up with a separator interposed between the cathode and anode sheets, the power generating element having a layered electrode portion on at least one side of the winding axis direction, the layered electrode portion being one of a cathode and an anode;

a current collector having a connection strip arranged along an outermost circumferential surface of the layered electrode portion, the current collector being conductively connected to an external terminal;

a first clamp that clamps the layered electrode portion; and a second clamp that clamps the layered electrode portion clamped by the first clamp and the connection strip of the current collector together.

In this case, the first clamp clamps the layered electrode portion, and the layered electrode portion is therefore prevented from expanding outward, which facilitates contact of the connection strips of the current collector with the outermost circumferential surface of the layered electrode portion. In the meantime, the second clamp clamps the layered electrode portion and the connection strips together, thus facilitating the positioning of the layered electrode portion and the current collector relative to each other to thereby ensure a reliable conductive connection therebetween.

In the battery cell of the present invention, it is preferred that the first clamp be located above the second clamp.

In this case, the layer thickness of the layered electrode portion is made smaller at its upper region by the first clamp, which therefore facilitates the arrangement of the connection strips of the current collector along the outermost circumferential surface of the layered electrode portion.

Furthermore, a method of manufacturing a battery cell according to the present invention includes:

clamping the layered electrode portion by the first clamp portion;

arranging the connection strip of the current collector along the outermost circumferential surface of the layered electrode portion; and clamping the layered electrode portion and the connection strip together by the second clamp portion.

Furthermore, a method of manufacturing a battery cell according to the present invention includes:

clamping the layered electrode portion by the first clamp;

arranging the connection strip of the current collector along the outermost circumferential surface of the layered electrode portion; and clamping the layered electrode portion and the connection strip together by the second clamp.

In this case, with the layered electrode portion being clamped, the layer thickness of the layered electrode portion or the overall thickness of the layered electrode portion can be made smaller. This is particularly advantageous for the manufacture of battery cells in which a layered electrode portion is inserted between the connection strips of the current collector.

Advantages of the Invention

As described above, according to the present invention, the layered electrode portion, which is located at a side of the power generating element formed of cathode and anode sheets that are wound up with a separator interposed between the cathode and anode sheets, is clamped. Then, the connection strips of the current collector are brought into contact with the outermost circumferential surface of the layered electrode portion that is in a state of being clamped, and in this state, the connection strips and the layered electrode portion are clamped together. This provides a reliable electrical connection between the layered electrode portion and the current collector while preventing the connection strips of the current collector from scratching the layered electrode portion.

BRIEF DESCRIPTION OF THE DRAWINGS

FIGS. 8(a) and 8(b) are perspective views showing the order in which the battery cell of FIG. 5 is assembled.

FIGS. 12(a) to 12(c) are perspective views showing the order in which the battery cell of FIG. 9 is assembled.

DETAILED DESCRIPTION OF THE PREFERRED EMBODIMENTS

With reference to FIGS. 1 to 12, described below is a battery cell according to embodiments of the present invention.

(Embodiment 1)

Figure 1:
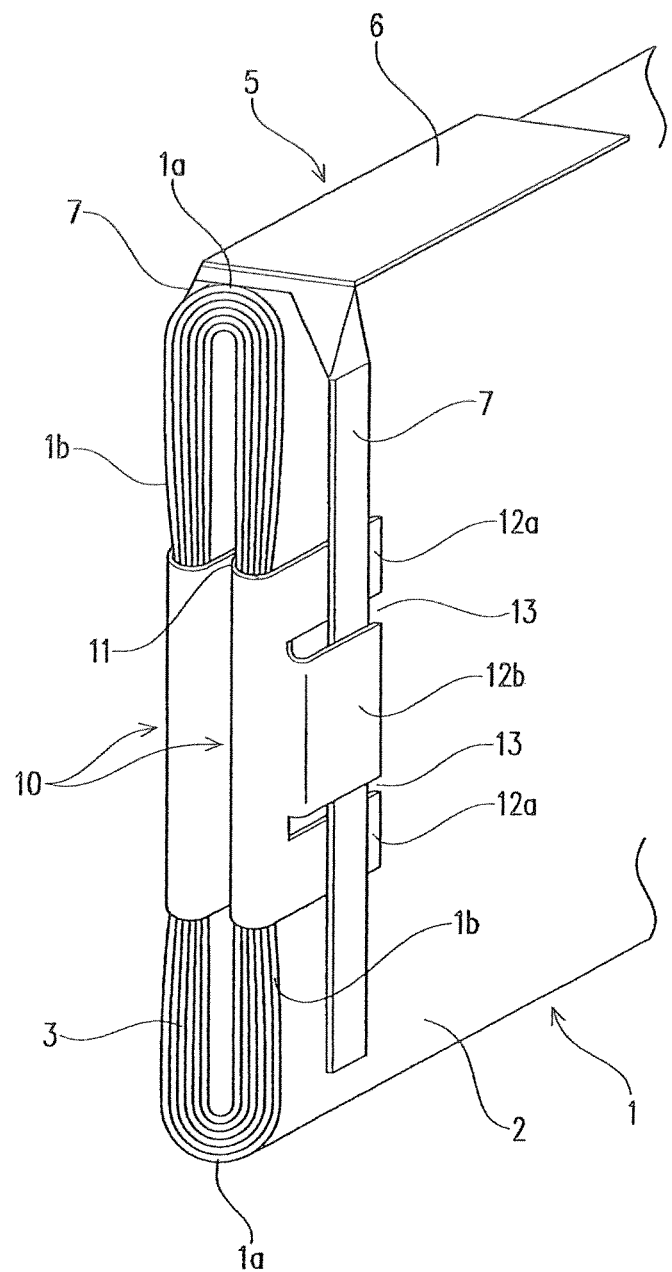
FIG. 1 is a perspective view of a battery cell according to Embodiment 1 of the present invention.
Figure 2:
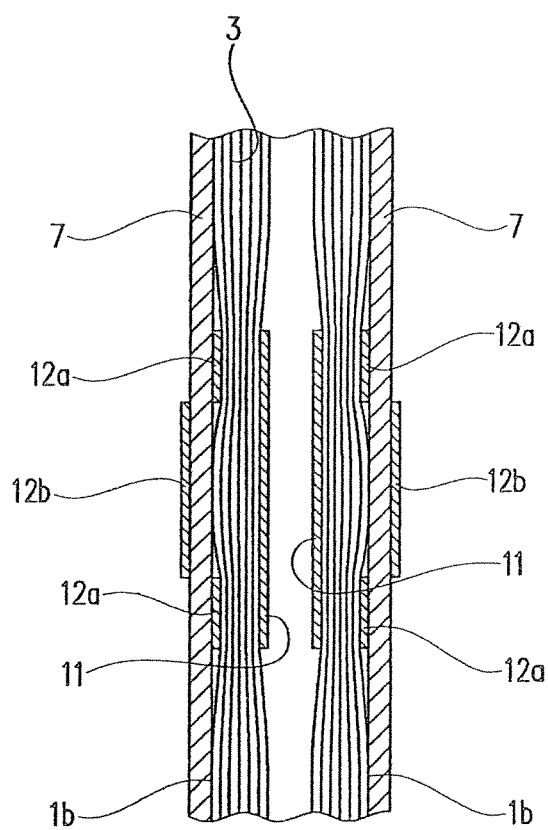
FIG. 2 is a cross-sectional view of FIG. 1.

As shown in FIGS. 1 and 2, a battery cell according to Embodiment 1 of the present invention includes: a power generating element 1; a current collector 5 that is electrically connected to the power generating element 1; and a pair of clamps 10 that together clamp a layered electrode portion 3 of the power generating element 1 and connection strip 7 of the current collector 5 which are later described.

The power generating element 1 is a single piece element. The power generating element 1 is formed by winding cathode and anode sheets 2, each having an electrode active material layer on both sides, with a separator (not shown) interposed therebetween, and has cathode and anode layered electrode portions 3 at their opposite ends. The power generating element 1 is formed into an oblong shape (a flattened shape) having curved portions 1a, 1a positioned at the upper and lower ends and flat portions 1b, 1b located between the curved portions 1a, 1a.

The current collector 5 has a body 6 to which an external terminal (not shown) is conductively connected; and connection strips 7, 7 extending from the body 6 along an outermost circumferential surface of the flat portions 1b, 1b of the layered electrode portion 3. In Embodiment 1, the power generating element 1 is provided as a single element, and the body 6 of the current collector 5 has a rectangular shape in plan view. The pair of connection strips 7, 7 extend from the body 6 along opposite sides of the outermost circumferential surface of the layered electrode portion 3.

Figure 3:
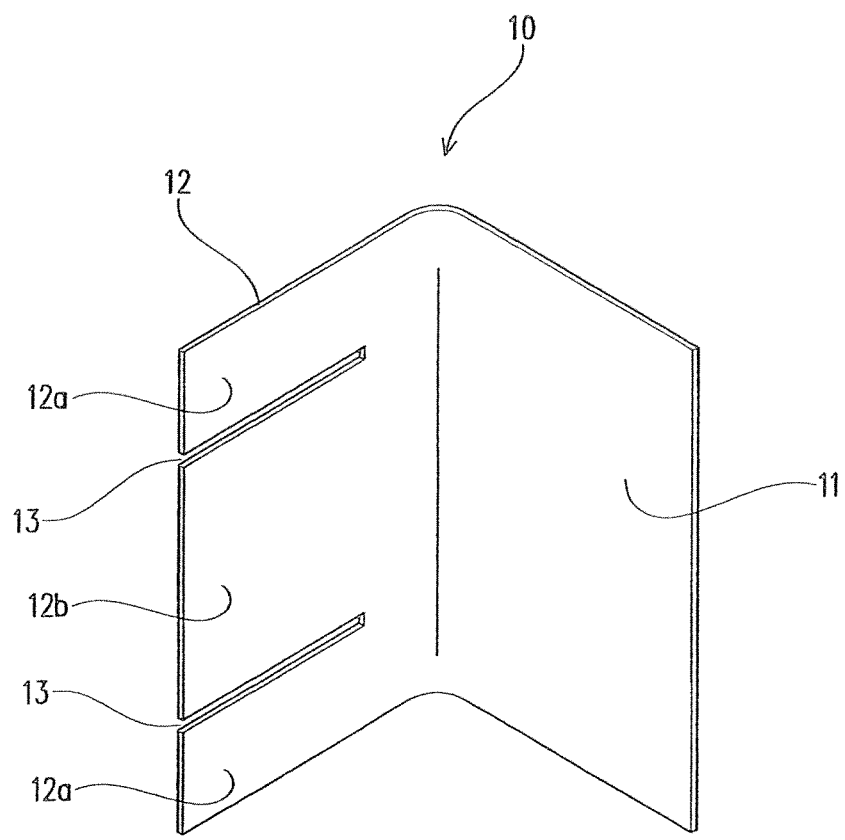
FIG. 3 is a perspective view of a clamp that is used in the battery cell of FIG. 1.

As shown in FIG. 3, each of the clamps 10, which is formed of a two-folded rectangular flat plate, has a first clamp half 11 that comes into contact with the innermost circumferential surface of the layered electrode portion 3 and a second clamp half 12 that comes into contact with the outermost circumferential surface of the layered electrode portion 3 and the outer surface of the corresponding connection strip 7 of the current collector 5. The first clamp half 11 is merely a flat plate, and has an area enough to press a middle portion of the innermost circumferential surface of the flat portions 1b, 1b of the layered electrode portion 3. The second clamp half 12 has a pair of upper and lower slits 13, 13 that are parallel to each other, which define upper and lower small clamp strips 12a, 12a, and define a large clamp strip 12b located between them. The first clamp half 11 and the small clamp strips 12a, 12a of the second clamp half 12 together constitute a first clamp portion to clamp the layered electrode portion 3. The first clamp half 11 and the large clamp strip 12b of the second clamp half 12 together constitute a second clamp portion to clamp the corresponding connection strip 7 of the current collector 5 and the layered electrode portion 3 together (cf., FIG. 2).

Figure 4A:
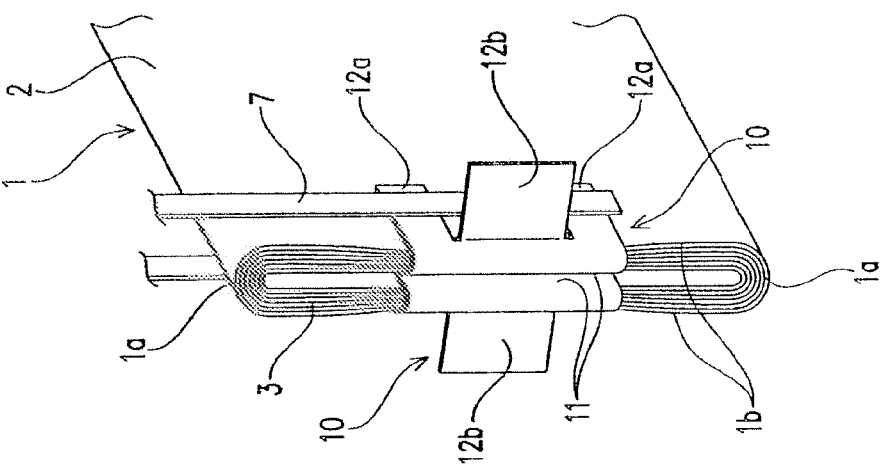
FIGS. 4(a) to 4(c) are perspective views showing the order in which the battery cell of FIG. 1 is assembled.
Figure 4B:
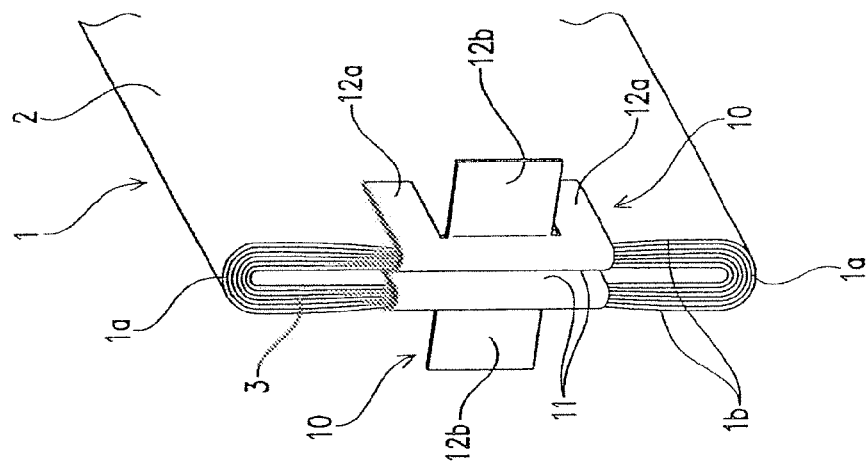
Figure 4C:
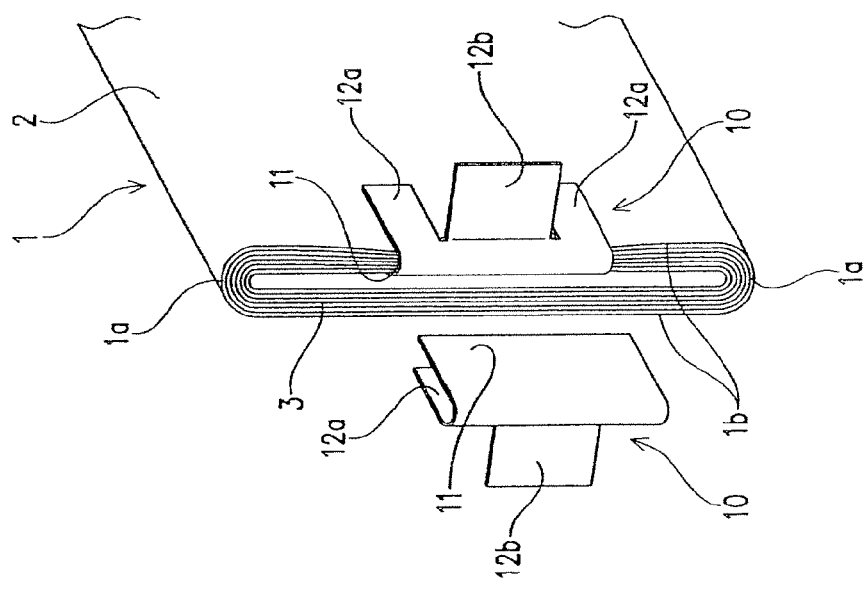
Figure 5:
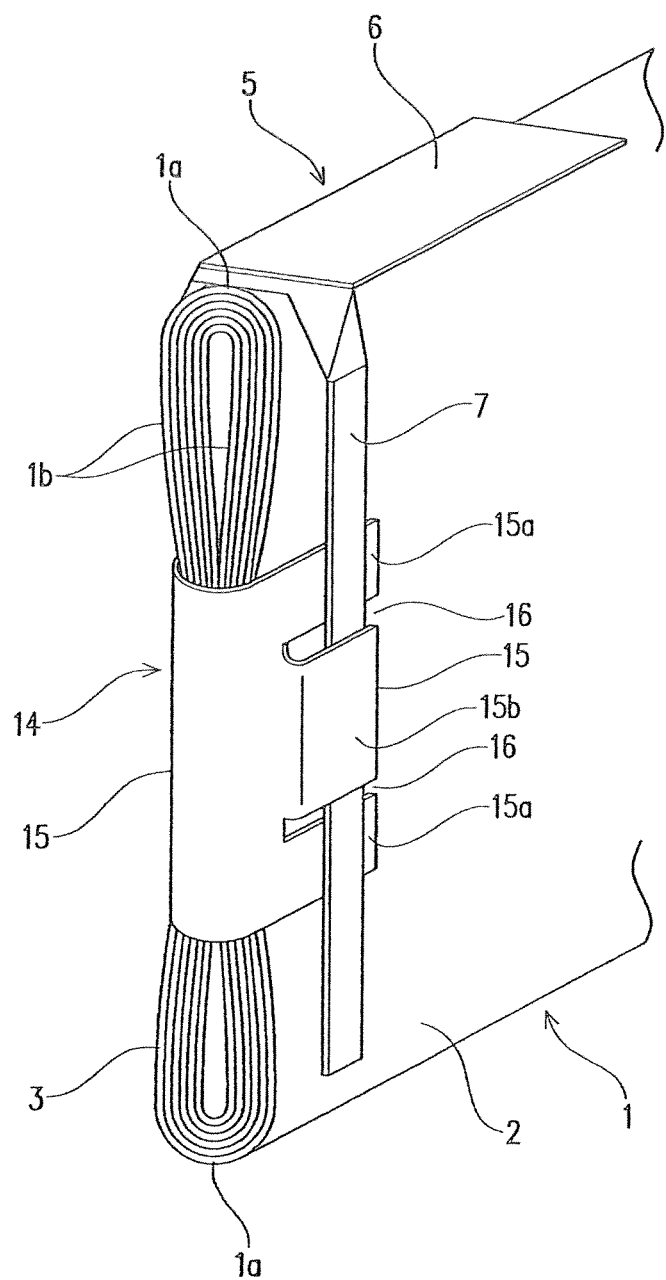
FIG. 5 is a perspective view of a battery cell according to Embodiment 2 of the present invention.
Figure 6:
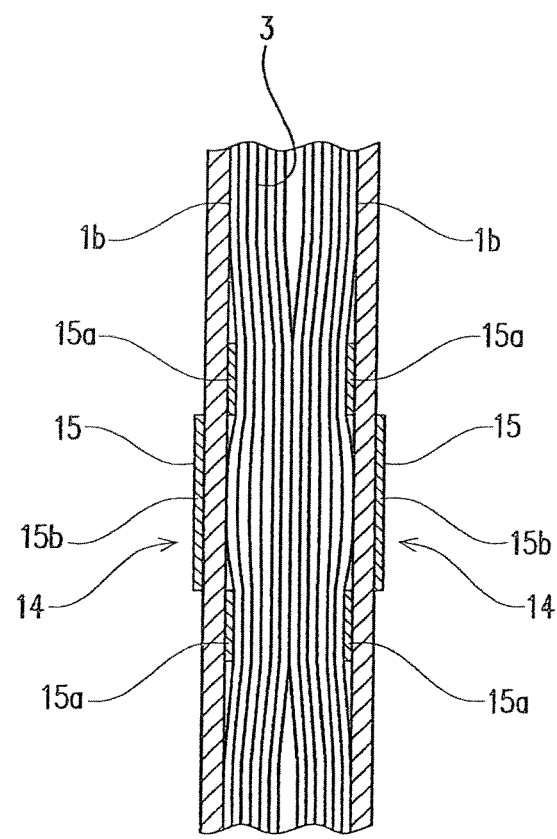
FIG. 6 is a cross-sectional view of FIG. 5.
Figure 7:
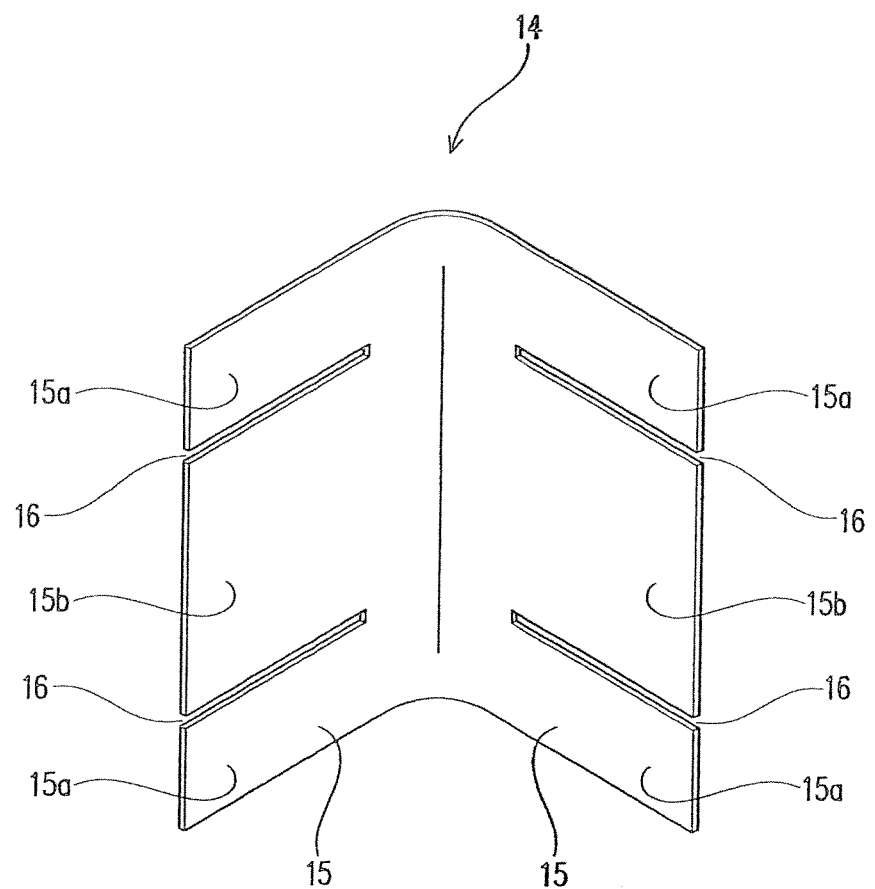
FIG. 7 is a perspective view of a clamp that is used in the battery cell of FIG. 5.
Figure 9:
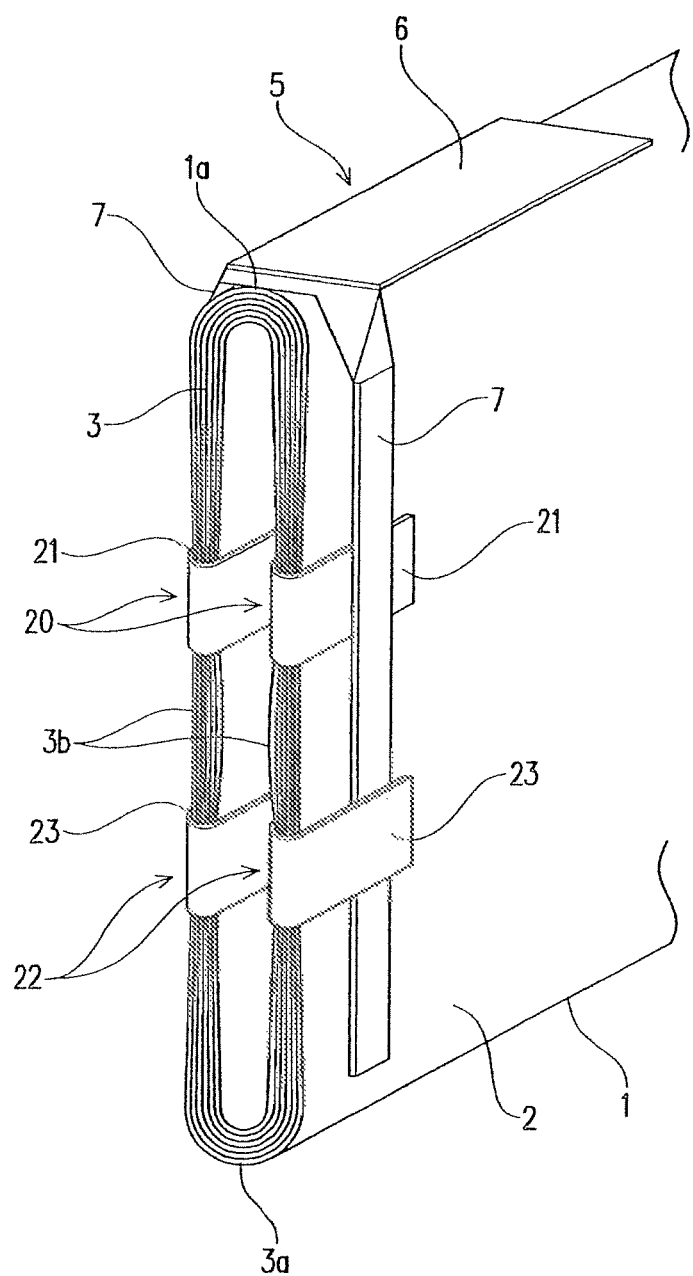
FIG. 9 is a perspective view of a battery cell according to Embodiment 3 of the present invention.
Figure 10:
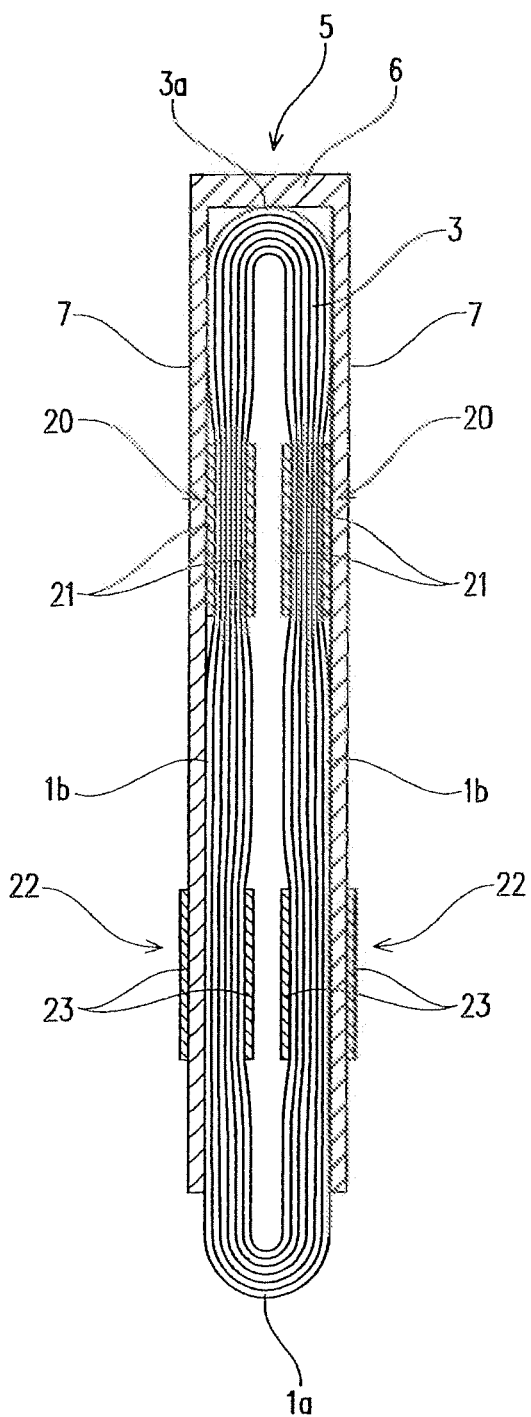
FIG. 10 is a cross-sectional view of FIG. 9.
Figure 11:
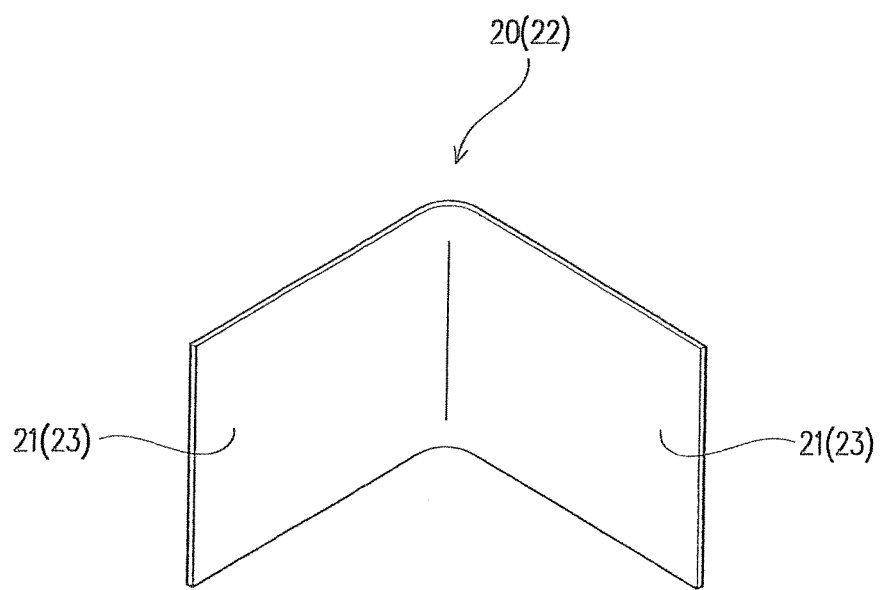
FIG. 11 is a perspective view of a clamp that is used in the battery cell of FIG. 9.

Described now is the order in which the battery cell of Embodiment 1 is assembled, with reference to FIGS. 4(a) to 4(c). First, as shown in FIG. 4 (a), the pair of clamp halves 11, 12 of the clamp 10 are bent close to each other to form a substantially U-shape while leaving the large clamp strip 12b of the second clamp half 12 unbent, i.e., oriented perpendicular to the small clamp strips 12a, 12a. Then, the first clamp half 11 is brought into contact with the innermost circumferential surface of the first flat portion 1b of the layered electrode portion 3 in such a manner as to straddle the first flat portion 1b, and the small clamp strip 12a, 12a of the second clamp half 12 are brought into contact with the outermost circumferential surface of the flat portion 1b. Then, the first clamp half 11 and the small clamp strips 12a, 12a are pressed through their outer surfaces to clamp the inner and outer surfaces of the flat portion 1b of the layered electrode portion 3, so as to reduce the thickness of the first flat portion 1b of the layered electrode portion 3. Thereafter, similarly to the above, the first clamp half 11 of another clamp 10 is brought into contact with the innermost circumferential surface of the second flat portion 1b of the layered electrode portion 3, and the small clamp strip 12a, 12a of the second clamp half 12 are brought into contact with the outermost circumferential surface of the second flat portion 1b. Then, the first clamp half 11 and the small clamp strips 12a, 12a are pressed through their outer surfaces to clamp the second flat portion 1b of the layered electrode portion 3, so as to reduce the thickness of the second flat portion 1b. Thus, the overall thickness of the layered electrode portion 3 is reduced (cf., FIG. 4 (b)).

In this state, as shown in FIG. 4 (c), the connection strips 7, 7 of the current collector 5 are inserted from above of the layered electrode portion 3 so that the inner surfaces of the connection strips 7, 7 of the current collector 5 extend along the outer surfaces of the small clamp strips 12a, 12a of the clamp 10 and the outermost circumferential surface of the layered electrode portion 3. Then, the large clamp strips 12b, 12b are folded to be oriented parallel with the small clamp strips 12a, 12a to press the outer surfaces of the connection strips 7, 7 of the current collector 5, so as to place the inn surfaces of the connection strips 7, 7 of the current collector 5 in pressure contact with the outermost circumferential surface of the layered electrode portion 3. Then, ultrasonic welding is performed to establish an electrical connection between the current collector 5 and the power generating element 1 (cf., FIG. 1).

In this case, the first clamp half 11 and the small clamp strips 12a, 12a of the second clamp half 12 together press the innermost and outermost circumferential surfaces of the layered electrode portion 3, so as to reduce the layer thickness of the layered electrode portion 3. This facilitates contact of the connection strips 7, 7 of the current collector 5 with the outermost circumferential surface of the layered electrode portion 3. Meanwhile, the first clamp half 11 and the large clamp strip 12b of the second clamp half 12 together press the innermost circumferential surface of the layered electrode portion 3 and the outer surface of the connection strips 7, 7, thereby clamping them together. This ensures a reliable conductive connection between the layered electrode portion 3 and the current collector 5. What is more, one clamp 10 and another clamp 10 are provided to clamp the first side of the layered electrode portion 3 and the second side of the layered electrode portion 3, respectively. With this structure, the two clamp halves 11, 11 of the adjacent clamps 10, 10 are positioned apart from each other, leaving a space between the two clamp halves 11, 11 to thereby prevent heat from building up in the middle portion of the power generating element 1.

(Embodiment 2)

Described now is a battery cell according to Embodiment 2, with reference to FIGS. 5 to 8. In these figures, numerals or symbols identical with those used in FIGS. 1 and 2 represent identical or corresponding parts or members. The difference lies in the configuration of a clamp 14, which includes clamp halves 15, 15, each having upper and lower small clamp strips 15a, 15a defined by slits 16, 16 and a large clamp strip 15b located between the two small clamp strips 15a, 15a. The small clamp strips 15a, 15a of each of the clamp halves 15, 15 press the outermost circumferential surface of the layered electrode portion 3 to squeeze the flat portions 1b, 1b of the layered electrode portion 3, thereby clamping the layered electrode portion 3 to have its overall thickness reduced.

Described now is the order in which the battery cell of the Embodiment 2 is assembled, with reference to FIGS. 8(a) and 8(b). First, as shown in FIG. 8 (a), the small clamp strips 15a, 15a of each of the clamp halves 15, 15 are bent close to each other to form a U-shape while leaving the large clamp strip 15b unbent, i.e., oriented perpendicular to the small clamp strips 15a, 15a. Then, the small clamp strips 15a, 15a of each of the clamp halves 15, 15 are brought into contact with the outermost circumferential surfaces of the flat portions 1b, 1b of the layered electrode portion 3 in such a manner as to straddle the first and second flat portions 1b, 1b. Then, the small clamp strips 15a, 15a are pressed through their outer surfaces to clamp the outer surfaces of the first and second flat portions 1b, 1b of the layered electrode portion 3, and to squeeze the flat portions 1b, 1b of the layered electrode portion 3 to reduce the overall thickness of the layered electrode portion 3.

In this state, as shown in FIG. 8 (b), the connection strips 7, 7 of the current collector 5 are inserted from above of the layered electrode portion 3 so that they extend along the outer surfaces of the small clamp strips 15a, 15a and the outermost circumferential surface of the layered electrode portion 3. Then, the pair of large clamp strips 15b, 15b are folded to be oriented parallel with the small clamp strips 15a, 15a to press the outer surfaces of the connection strips 7, 7 of the current collector 5. Thus, an electrical connection is established between the current collector 5 and the power generating element 1 (cf., FIGS. 5 and 6).

(Embodiment 3)

Described now is a battery cell according to Embodiment 3, with reference to FIGS. 9 to 12. In these figures, numerals or symbols identical with those used in FIGS. 1 and 2 represent identical or corresponding parts or members. The difference lies in: a first clamp 20 including a pair of clamp halves 21, 21 to clamp the layered electrode portion 3 by pressing the innermost and outermost circumferential surfaces of the layered electrode portion 3; and a second clamp 22 that presses the innermost circumferential surface of the layered electrode portion 3 and the outer surfaces of the connection strips 7, 7 in a state in which the layered electrode portion 3 is clamped by the first clamp 20 and the connection strips 7, 7 of the current collector 5 are disposed along the outermost circumferential surface of the clamped layered electrode portion 3 (cf., FIG. 11), thereby clamping them together. In Embodiment 3, the first and second clamps 20, 22 have the same configuration, and is formed of a two-folded flat plate having a rectangular shape in plan view.

In this case, the pair of clamp halves 21, 21 of the first clamps 20 clamp the flat portions 1b, 1b of the layered electrode portion 3 through the innermost and outermost circumferential surfaces at their upper regions, so as to reduce the layer thickness of the upper regions. This therefore facilitates the arrangement of the connection strips 7, 7 of the current collector 5 along the outermost circumferential surface of the layered electrode portion 3.

Described now is the order in which the battery cell is assembled, with reference to FIGS. 12(a) to 12(c). First, each of the two first clamps 20 is bent to bring the clamp halves 21, 21 close to each other to form a U-shape while each of the two second clamps 22, 22 is also bent to bring the clamp halves 23, 23 close to each other in a similar manner. Then, as shown in FIG. 12(a), the first clamp half 21 of each of the first clamps 20 is brought into contact with the innermost circumferential surface of each of the first and second flat portions 1b, 1b of the layered electrode portion 3 in such a manner as to straddle the upper region of the layered electrode portion 3, and the second clamp half 21 of each of the first clamps 20 is brought into contact with the outermost circumferential surface of the layered electrode portion 3. Then, the clamp halves 21, 21 are pressed through their outer surfaces to clamp the innermost and outermost circumferential surfaces of the first and second flat portions 1b, 1b at their upper regions, so as to reduce the thickness of the upper regions of the two flat portions 1b, 1b of the layered electrode portion 3.

In this state, as shown in FIG. 12 (b), the connection strips 7, 7 of the current collector 5 are inserted from above of the layered electrode portion 3 to extend along the outer surfaces of the clamp halves 21, 21 of the first clamps 20 and the outermost circumferential surface of the layered electrode portion 3. Then, as shown in FIG. 12 (c), the first clamp half 23 of each of the second clamps 22 is brought into contact with the innermost circumferential surface of the layered electrode portion 3 at each of the first and second flat portions 1b, 1b of the layered electrode portion 3 in such a manner as to straddle the lower region of the layered electrode portion 3, and the second clamp half 23 of each of the second clamps 23 is brought into contact with the outer surface of each of the connection strips 7, 7 of the current collector 5. Then, the clamp halves 23, 23 are pressed through their outer surfaces, so that an electrical connection is established between the current collector 5 and the power generating element 1 (cf., FIGS. 9 and 10).

In the above embodiment, the power generating element 1 is configured to have an oblong cross section, but alternatively the cross section may be circular or angular. In accordance with this, the connection strips 7, 7 of the current collector 5 may be configured to have a circular or angular shape.

DESCRIPTION OF REFERENCE CODES

1: power generating element, 1a: curved portion, 1b: flat portion, 2: electrode sheet, 3: layered electrode portion, 5: current collector, 6: body, 7: connection strip, 10, 14: clamp, 11, 12: clamp half, 12a: small clamp strip, 12b: large clamp strip, 11, 12a: first clamp portion, 11, 12b: second clamp portion, 14: clamp, 15: clamp half, 15a: small clamp strip, 15b: large clamp strip, 20: first clamp, 21: clamp half, 22: second clamp, 21: clamp half

The invention claimed is:

1. A battery cell, comprising:
a power generating element including cathode and anode sheets that are wound up with a separator interposed between the cathode and anode sheets, the power generating element comprising a layered electrode portion on at least one side of a winding axis direction, the layered electrode portion comprising one of a cathode and an anode;
a current collector including a connection strip arranged along an outermost circumferential surface of the layered electrode portion, the current collector being conductively connected to an external terminal; and
a clamp including:
a first clamp portion that clamps the layered electrode portion, the first clamp portion including an inner surface and an outer surface, the inner surface being in contact with and clamping the layered electrode portion; and
a second clamp portion that clamps the layered electrode portion and the connection strip of the current collector together,
wherein the connection strip extends on the outer surface of the first clamp portion.

2. The battery cell according to claim 1, wherein the first clamp portion comprises a pair of the first clamp portions, and the second clamp portion is disposed between the pair of the first clamp portions.

3. The battery cell according to claim 2, wherein the clamp includes a first clamp half and a second clamp half, the second clamp half including upper and lower clamp strips and a central clamp strip, and wherein the first clamp half and the upper and lower clamp strips of the second clamp half together constitute the first clamp portions, and the first clamp half and the central clamp strip of the second clamp half together constitute the second clamp portion.

4. The battery cell according to claim 1, wherein the clamp comprises separate clamps, one of which clamps a first side of the layered electrode portion, and another of which clamps a second side of the layered electrode portion.

5. The battery cell according to claim 4, wherein the first clamp portion comprises a pair of the first clamp portions, and the second clamp portion is disposed between the pair of the first clamp portions.

6. The battery cell according to claim 5, wherein the clamp includes a first clamp half and a second clamp half, the second clamp half including upper and lower clamp strips and a central clamp strip, and wherein the first clamp half and the upper and lower clamp strips of the second clamp half together constitute the first clamp portions, and the first clamp half and the central clamp strip of the second clamp half together constitute the second clamp portion.

7. The battery cell according to claim 1, wherein the power generating element has a flattened shape, and the layered electrode portion includes a pair of curved portions and first and second flat portions located between the curved portions, and wherein the clamp comprises separate clamps, one of which clamps the first flat portion of the layered electrode portion, and the other of which clamps the second flat portion of the layered electrode portion.

8. The battery cell according to claim 7, wherein the first clamp portion comprises a pair of the first clamp portions, and the second clamp portion is disposed between the pair of the first clamp portions.

9. The battery cell according to claim 8, wherein the clamp includes a first clamp half and a second clamp half, the second clamp half including upper and lower clamp strips and a central clamp strip, and wherein the first clamp half and the upper and lower clamp strips of the second clamp half together constitute the first clamp portions, and the first clamp half and the central clamp strip of the second clamp half together constitute the second clamp portion.

10. The battery cell according to claim 1, wherein the clamp is configured to clamp both first and second sides of the layered electrode portion.

11. The battery cell according to claim 10, wherein the first clamp portion comprises a pair of the first clamp portions, and the second clamp portion is disposed between the pair of the first clamp portions.

12. The battery cell according to claim 11, wherein the clamp includes a first clamp half and a second clamp half, the second clamp half including upper and lower clamp strips and a central clamp strip, and wherein the upper and lower clamp strips of the first clamp half and the upper and lower clamp strips of the second clamp half together constitute the first clamp portions, and the central clamp strip of the first clamp half and the central clamp strip of the second clamp half together constitute the second clamp portion.

13. The battery cell according to claim 1, wherein the power generating element has a flattened shape, and the layered electrode portion includes a pair of curved portions, and first and second flat portions located between the curved portions, and wherein the clamp is configured to clamp both the first and second flat portions of the layered electrode portion.

14. The battery cell according to claim 13, wherein the first clamp portion comprises a pair of the first clamp portions, and the second clamp portion is disposed between the pair of the first clamp portions.

15. The battery cell according to claim 14, wherein the clamp includes a first clamp half and a second clamp half, the second clamp half including upper and lower clamp strips and a central clamp strip, and wherein the upper and lower clamp strips of the first clamp half and the upper and lower clamp strips of the second clamp half together constitute the first clamp portions, and the central clamp strip of the first clamp half and the central clamp strip of the second clamp half together constitute the second clamp portion.

16. A battery cell, comprising:

a power generating element including cathode and anode sheets that are wound up with a separator interposed between the cathode and anode sheets, the power generating element comprising a layered electrode portion on at least one side of a winding axis direction, the layered electrode portion comprising one of a cathode and an anode;

a current collector including a connection strip arranged along an outermost circumferential surface of the layered electrode portion, the current collector being conductively connected to an external terminal; and a clamp that clamps the layered electrode portion, the clamp including an inner surface and an outer surface, the inner surface being in contact with and clamping the layered electrode portion, wherein the connection strip extends on the outer surface of the clamp.

17. The battery cell according to claim 1, wherein the clamp includes a first clamp half and a second clamp half, the second clamp half including upper and lower clamp strips and a central clamp strip, and wherein the first clamp half and the upper and lower clamp strips of the second clamp half together constitute the first clamp portion, and the first clamp half and the central clamp strip of the second clamp half together constitute the second clamp portion.

18. The battery cell according to claim 16, wherein the clamp includes a first clamp half and a second clamp half, the second clamp half including upper and lower clamp strips and a central clamp strip, and wherein the first clamp half and the upper and lower clamp strips of the second clamp half together constitute a first clamp portion of the clamp that clamps the layered electrode portion, and the first clamp half and the central clamp strip of the second clamp half together constitute a second clamp portion of the clamp that clamps the layered electrode portion and the connection strip of the current collector together.

* * * * *